United States Patent
Roeck

(10) Patent No.: US 12,466,701 B2
(45) Date of Patent: Nov. 11, 2025

(54) ENERGY SUPPLY SYSTEM

(71) Applicant: Palfinger AG, Bergheim bei Salzburg (AT)

(72) Inventor: Christoph Roeck, Bad Hofgastein (AT)

(73) Assignee: PALFINGER AG, Bergheim bei Salzburg (AT)

( * ) Notice: Subject to any disclaimer, the term of this patent is extended or adjusted under 35 U.S.C. 154(b) by 764 days.

(21) Appl. No.: 17/842,028

(22) Filed: Jun. 16, 2022

(65) Prior Publication Data

US 2022/0306430 A1 Sep. 29, 2022

Related U.S. Application Data

(63) Continuation of application No. PCT/AT2020/060445, filed on Dec. 10, 2020.

(30) Foreign Application Priority Data

Dec. 17, 2019 (AT) ............... GM 50231/2019

(51) Int. Cl.
*B66C 13/12* (2006.01)
*B65H 75/36* (2006.01)
(Continued)

(52) U.S. Cl.
CPC ........... *B66C 13/12* (2013.01); *B65H 75/364* (2013.01); *B66C 13/14* (2013.01); *F16G 13/16* (2013.01);
(Continued)

(58) Field of Classification Search
CPC ....... B66C 13/12; B66C 23/54; B66C 23/701; B66C 13/14; B65H 75/364;
(Continued)

(56) References Cited

U.S. PATENT DOCUMENTS 4,470,229 A * 9/1984 Muse ................ B66C 13/12
52/118
4,736,901 A 4/1988 Betencourt
(Continued)

FOREIGN PATENT DOCUMENTS

AT 13742 8/2014
CN 109562905 4/2019
(Continued)

OTHER PUBLICATIONS

International Search Report issued Mar. 2, 2021 in International (PCT) Application No. PCT/AT2020/060445.

*Primary Examiner* — Zachary L Kuhfuss
(74) *Attorney, Agent, or Firm* — Wenderoth, Lind & Ponack, L.L.P.

(57) ABSTRACT

An energy supply system includes a cable store for winding and unwinding an energy cable about a winding center of the cable store. A carrier is provided for the energy cable, and the cable store has an opening for the inlet and outlet of the carrier and the energy cable. The carrier can be guided through the opening in order to guide the carrier and the energy cable in sections in the cable store to the winding center of the cable store over a first guide path through a first guide arc, over a second guide path which adjoins the first guide arc, through a second guide arc, and over a third guide path which adjoins the second guide arc and lies further inwards relative to the winding center than the first guide path using guides.

19 Claims, 16 Drawing Sheets

Figure 12A:
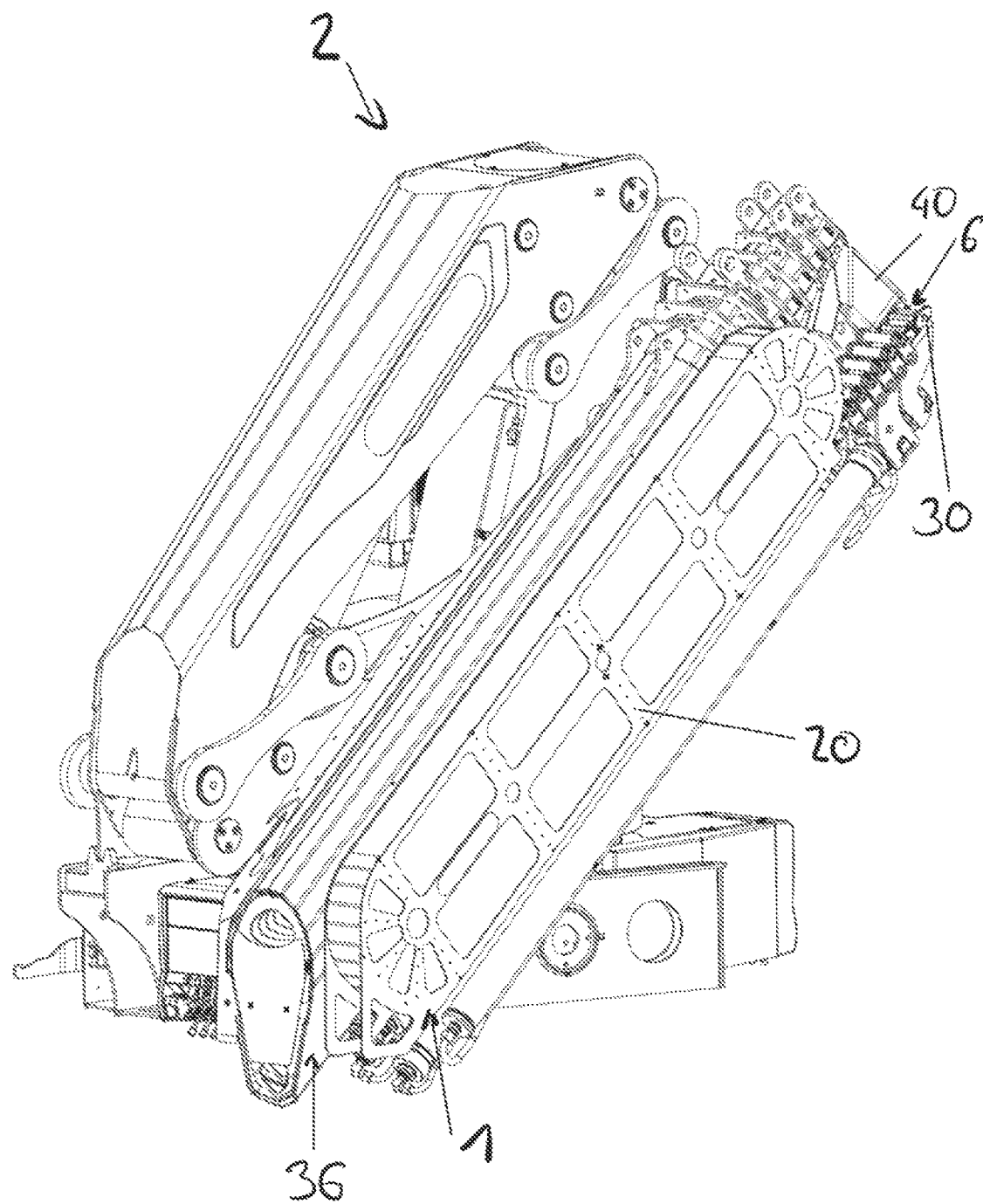

(51) Int. Cl.
*B66C 13/14* (2006.01)
*F16G 13/16* (2006.01)
*H02G 11/00* (2006.01)
*H02G 11/02* (2006.01)
*B65H 75/44* (2006.01)
*B66C 23/00* (2006.01)
*B66C 23/70* (2006.01)

(52) U.S. Cl.
CPC ........... *H02G 11/006* (2013.01); *H02G 11/02* (2013.01); *B65H 75/4449* (2013.01); *B65H 2701/34* (2013.01); *B65H 2701/3911* (2013.01); *B66C 23/54* (2013.01); *B66C 23/701* (2013.01)

(58) Field of Classification Search
CPC ........ B65H 2701/34; B65H 2701/3911; H02G 11/006; H02G 11/02; F16G 13/16
USPC ........................................................ 191/12 C See application file for complete search history.

(56) References Cited

U.S. PATENT DOCUMENTS

| | | | |
|---|---|---|---|
| 5,924,837 A * | 7/1999 | Passmann | B66C 23/701 |
| | | | 414/718 |
| 11,608,875 B2 * | 3/2023 | Theiss | B65H 75/4478 |
| 2006/0042175 A1 * | 3/2006 | Crespi | H02G 11/006 |
| | | | 52/111 |
| 2014/0251726 A1 * | 9/2014 | Ditty | B66C 13/12 |
| | | | 182/69.4 |
| 2018/0320757 A1 * | 11/2018 | Tetsuka | F16G 13/16 |
| 2019/0257388 A1 | 8/2019 | Theiss | |
| 2020/0185900 A1 | 6/2020 | Theiss | |
| 2023/0025581 A1 * | 1/2023 | Dommnik | H02G 3/04 |
| 2023/0026012 A1 * | 1/2023 | Barten | F16G 13/16 |

FOREIGN PATENT DOCUMENTS

| | | |
|---|---|---|
| CN | 110023647 | 7/2019 |
| EP | 2 610 208 | 7/2013 |
| FR | 2 586 634 | 3/1987 |
| JP | 5-85673 | 4/1993 |
| JP | 2019-533622 | 11/2019 |
| JP | 2023-507135 | 2/2023 |
| WO | 2018/072941 | 4/2018 |

* cited by examiner

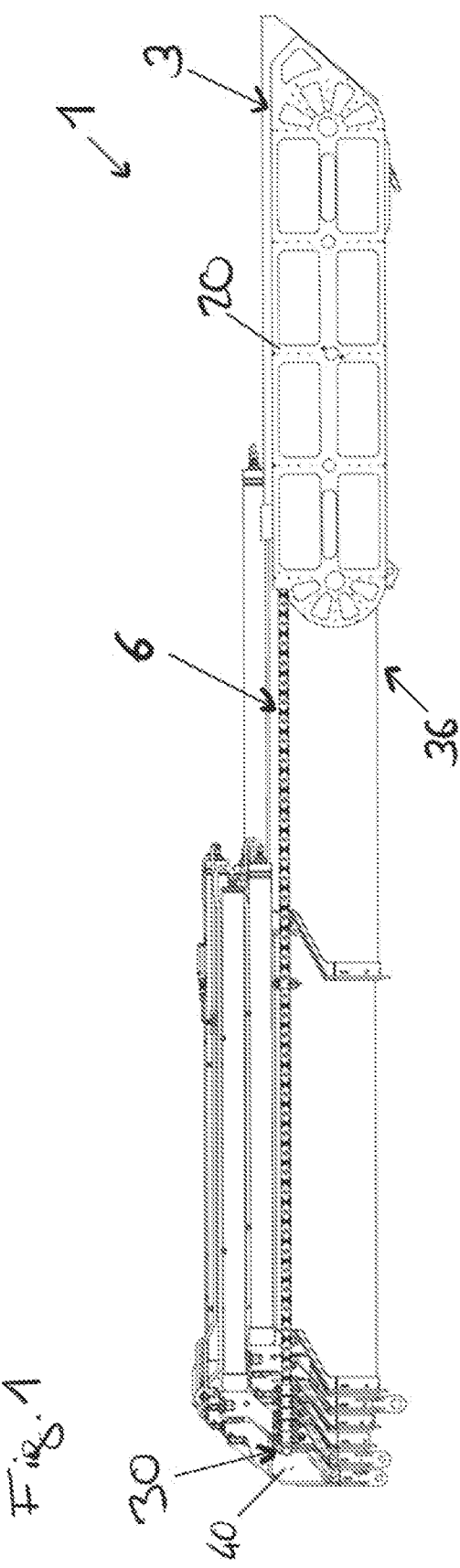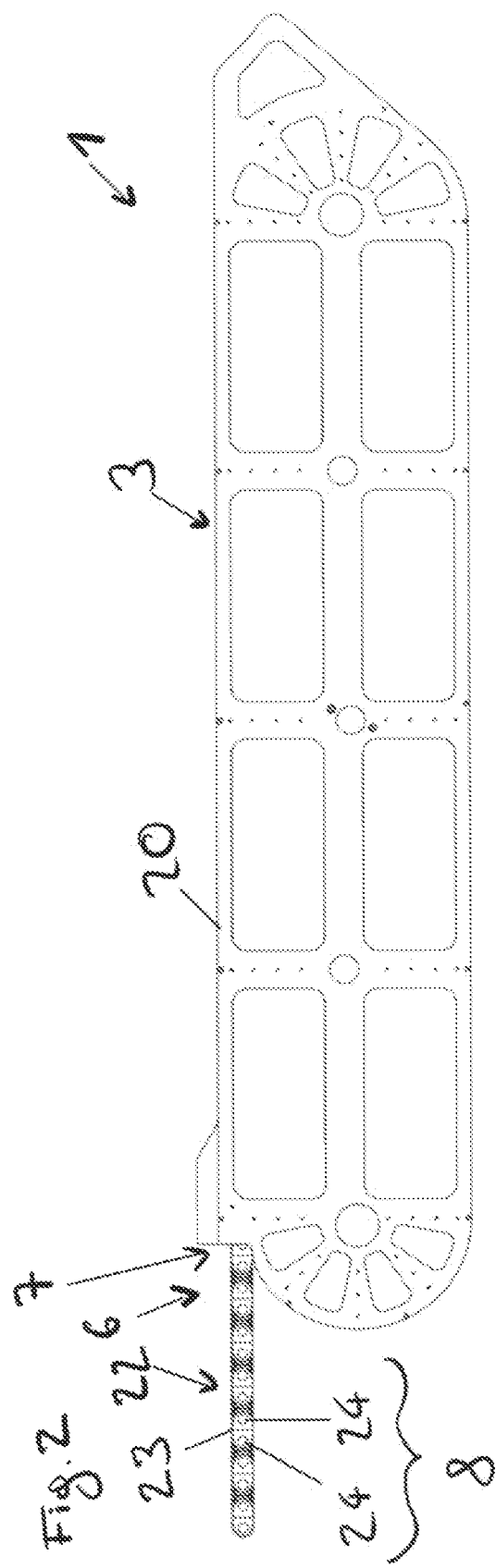

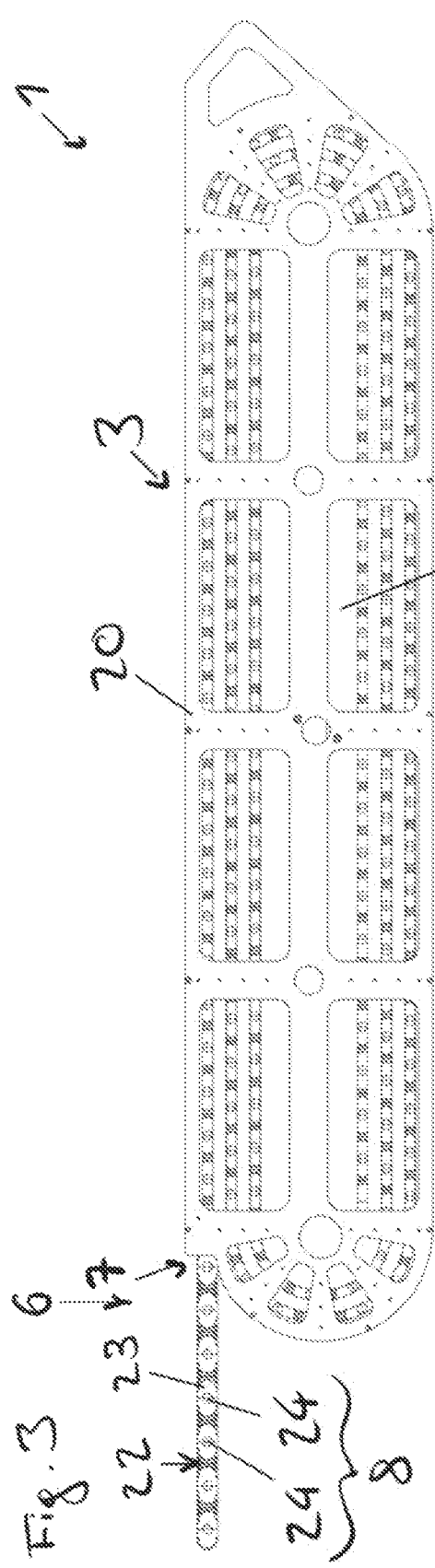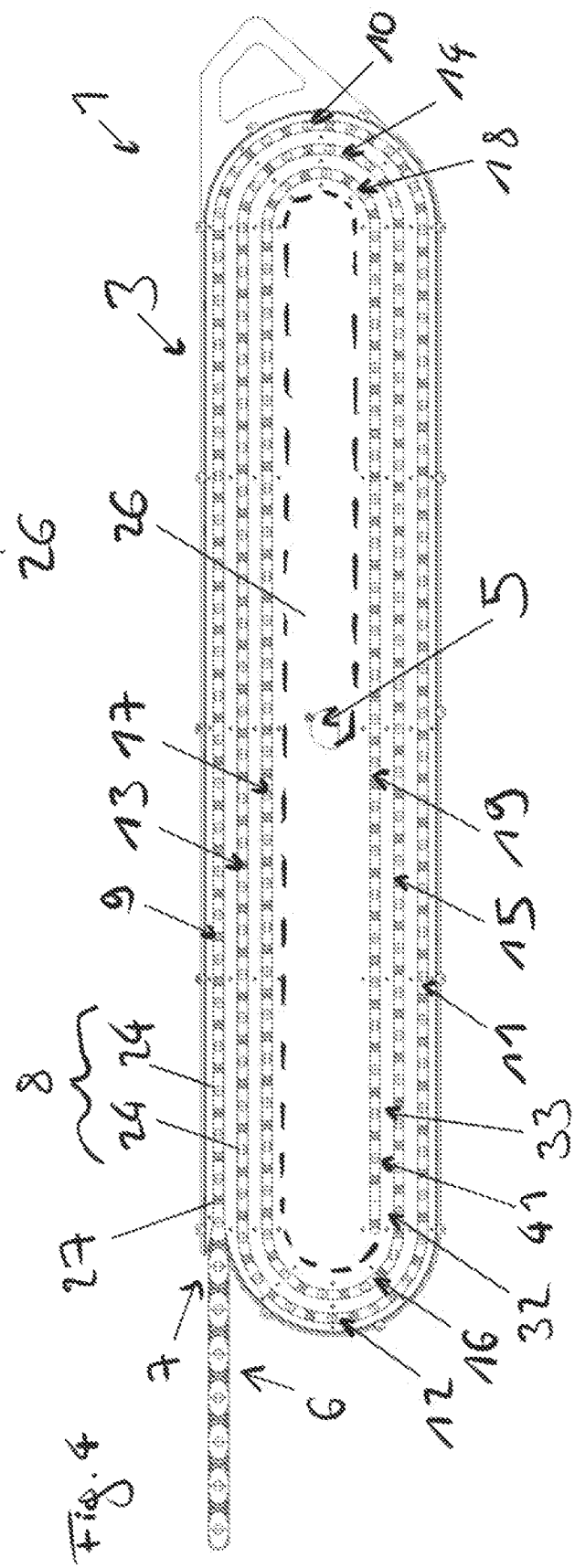

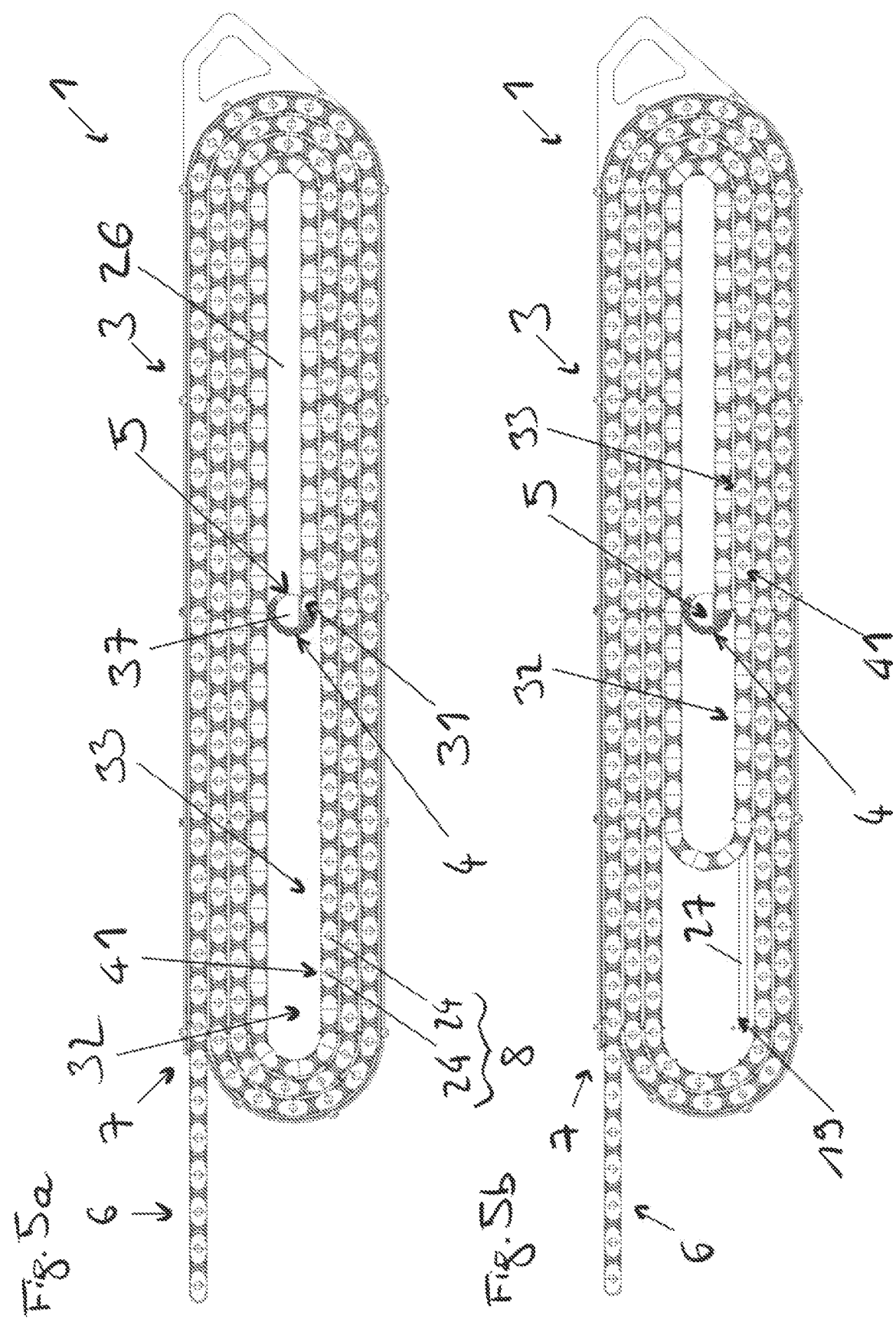

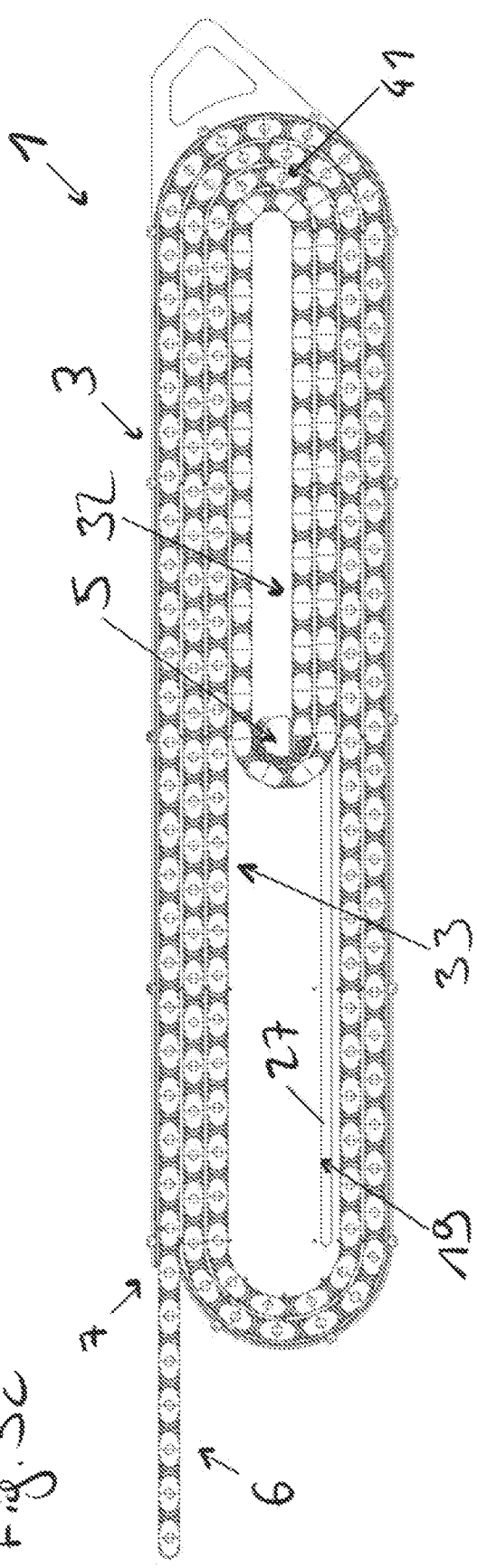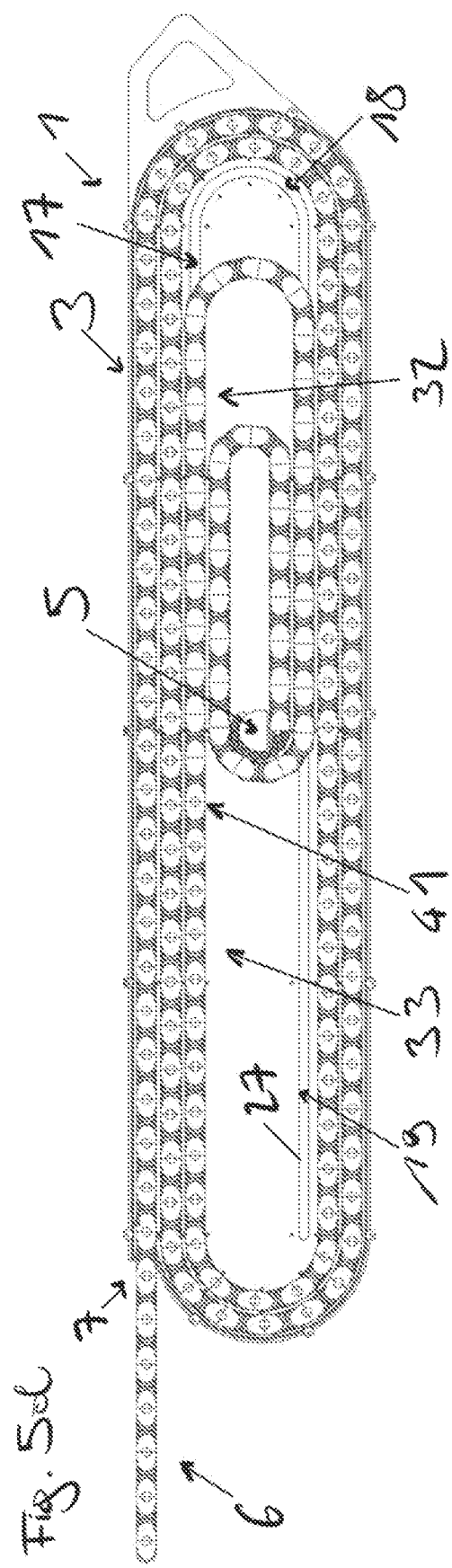

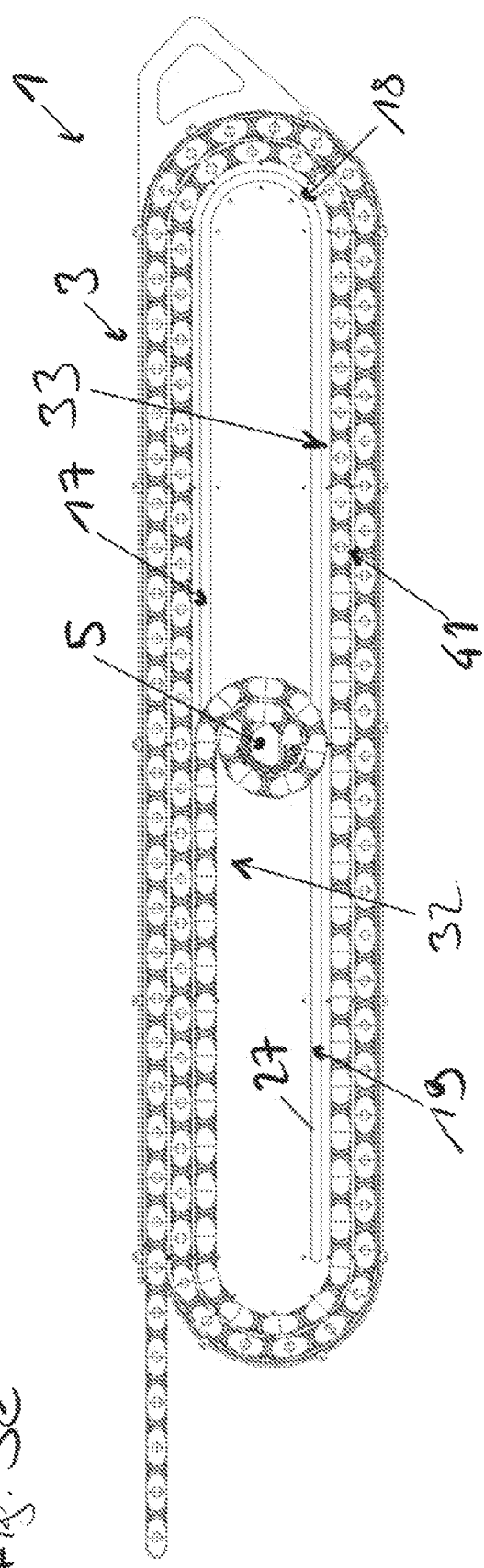

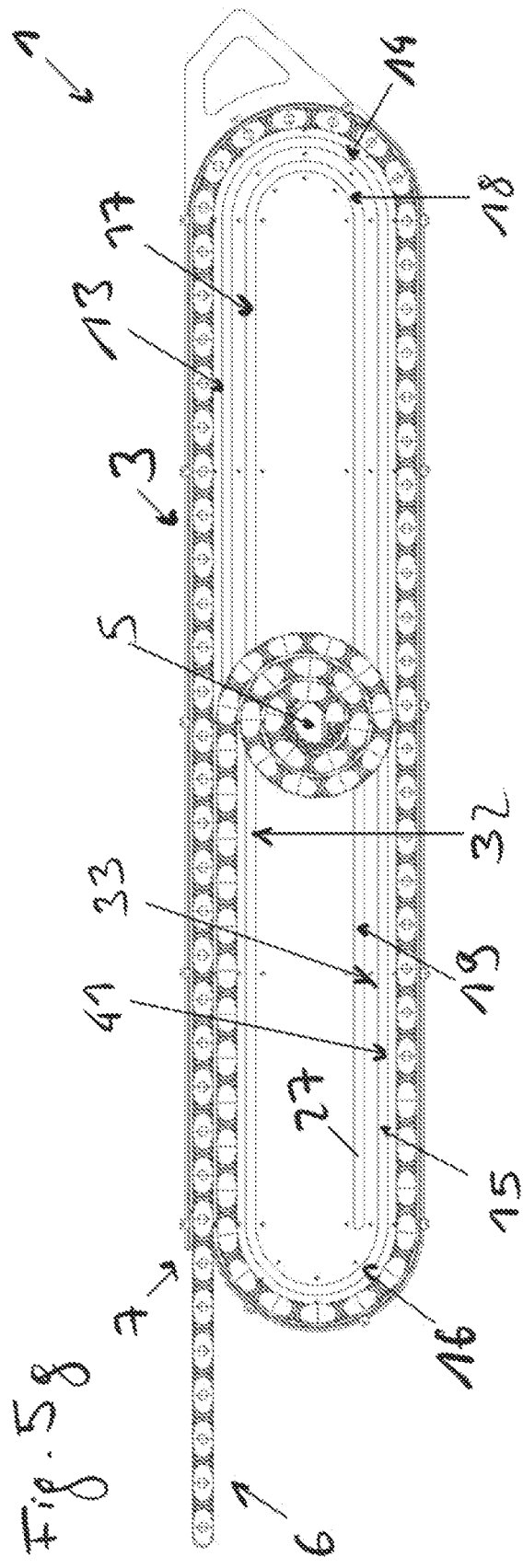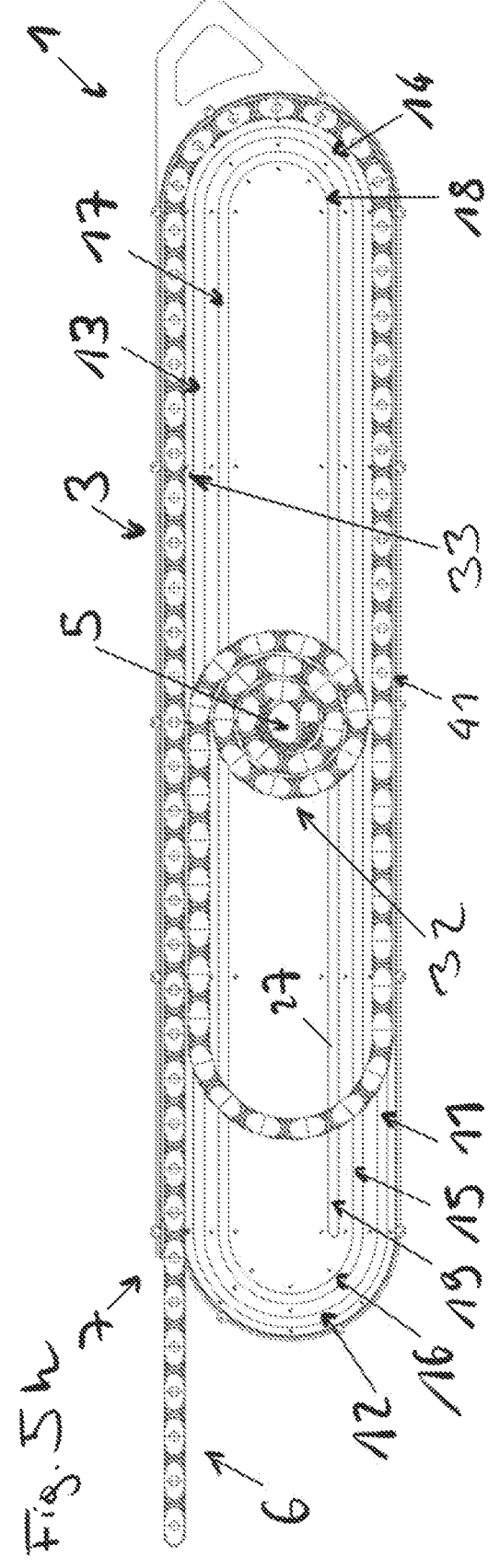

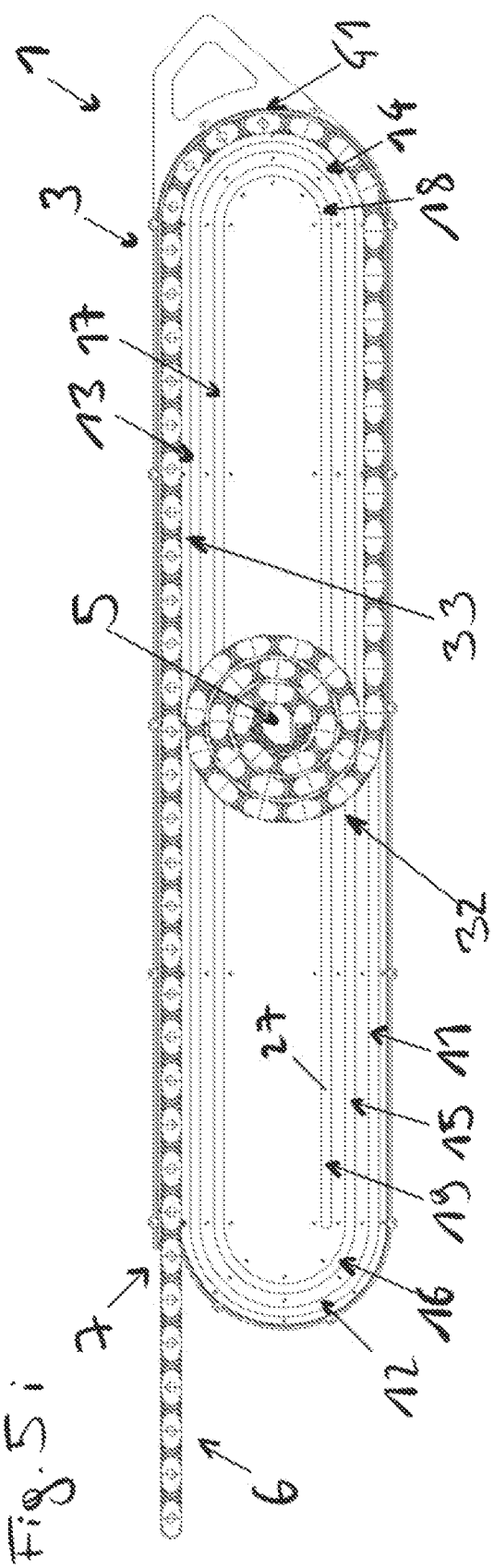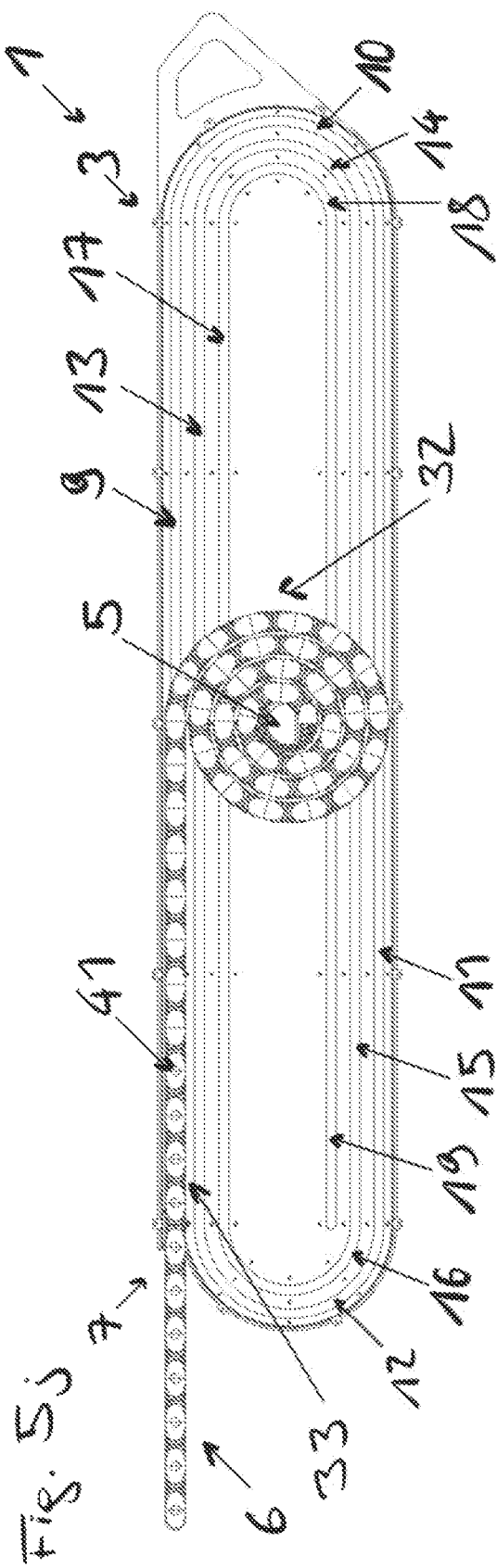

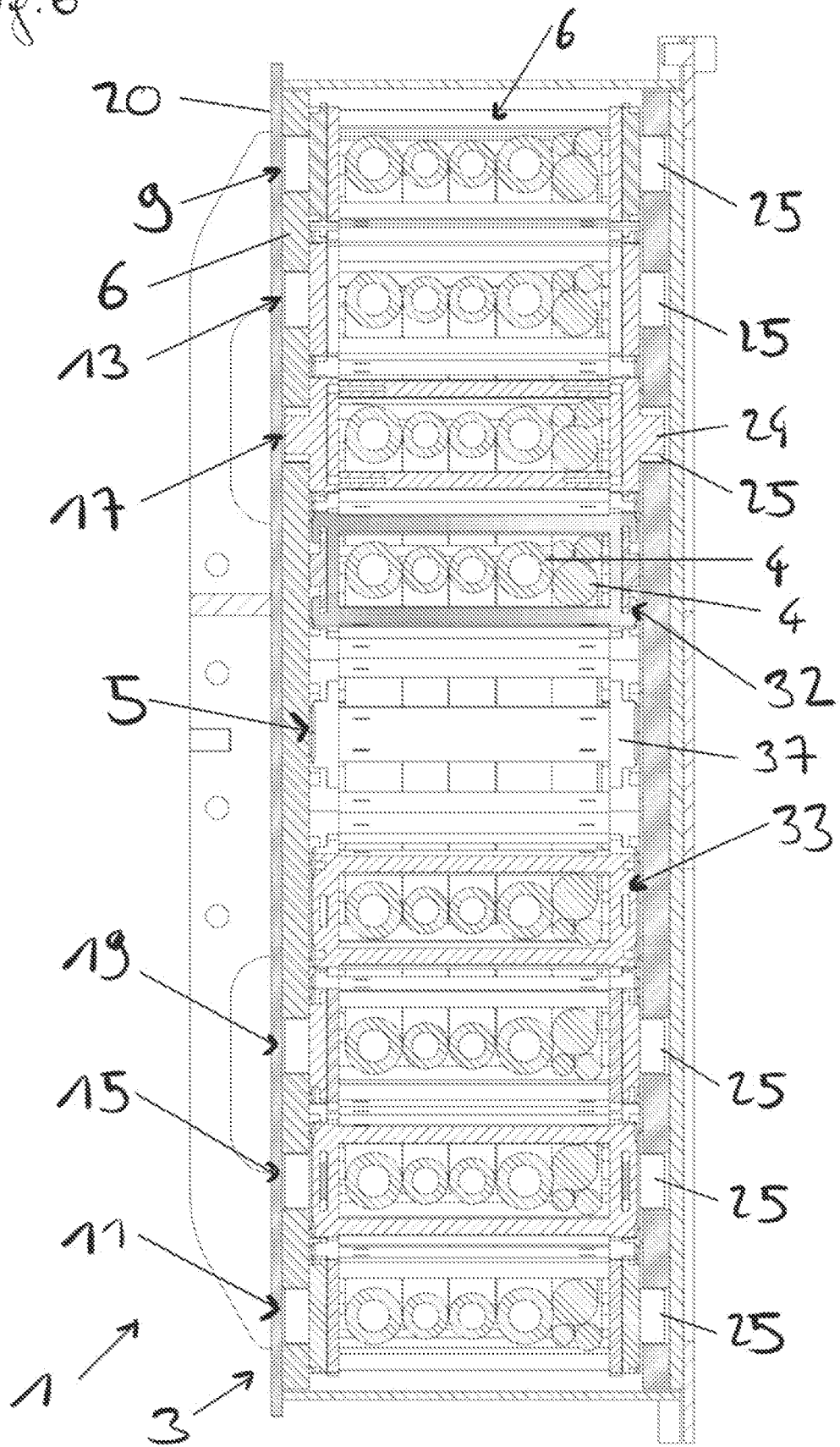

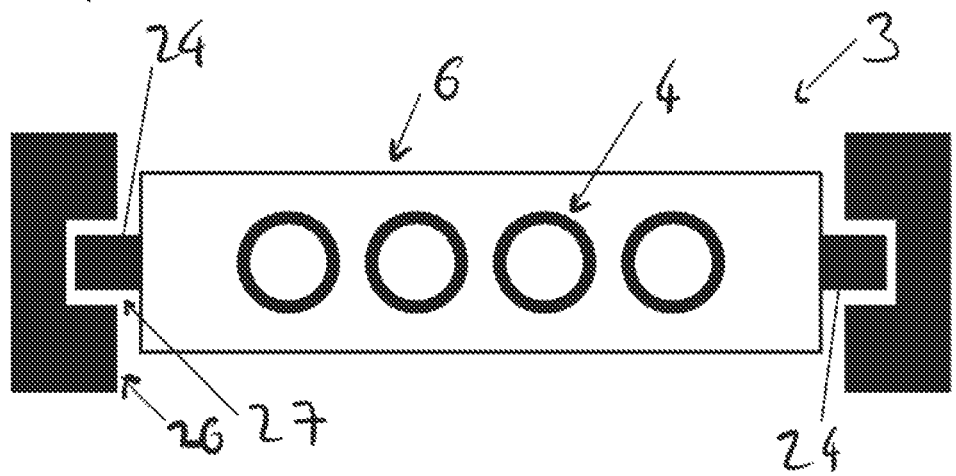
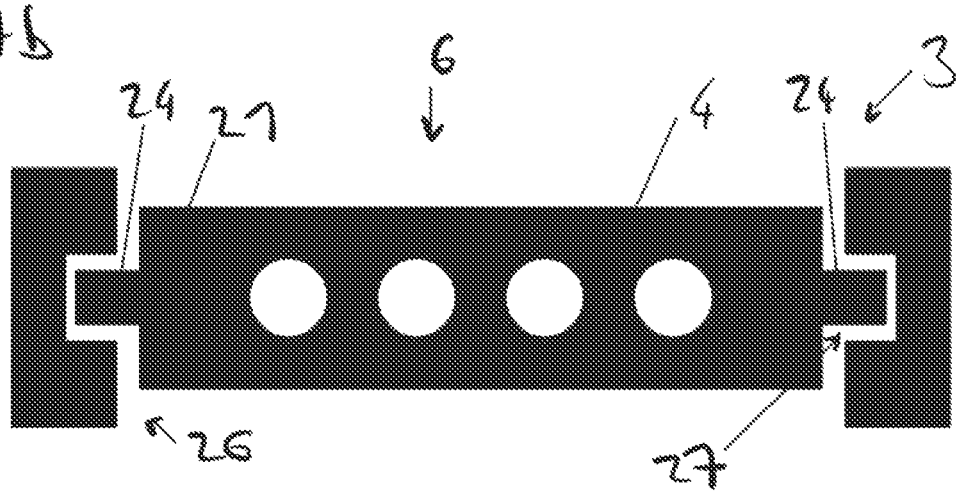
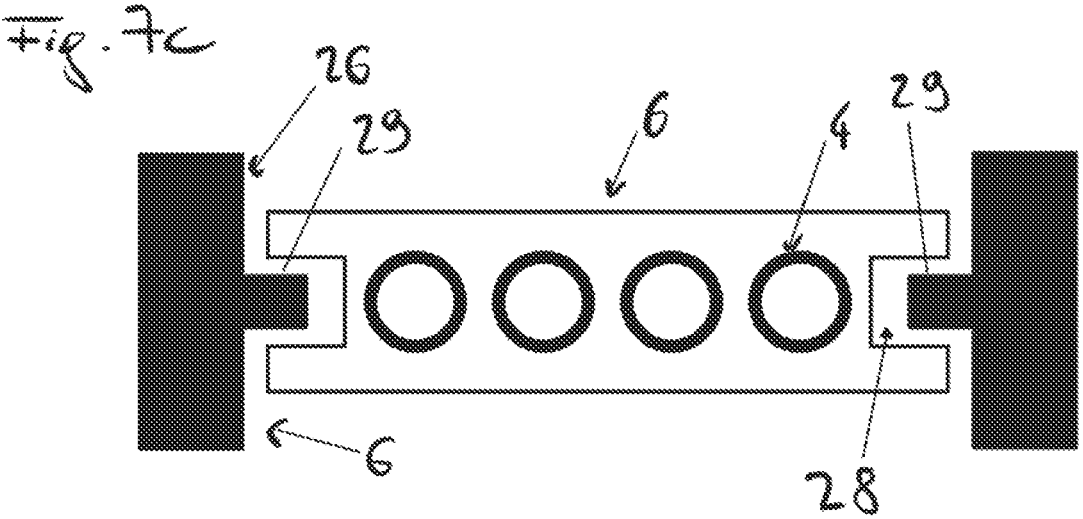

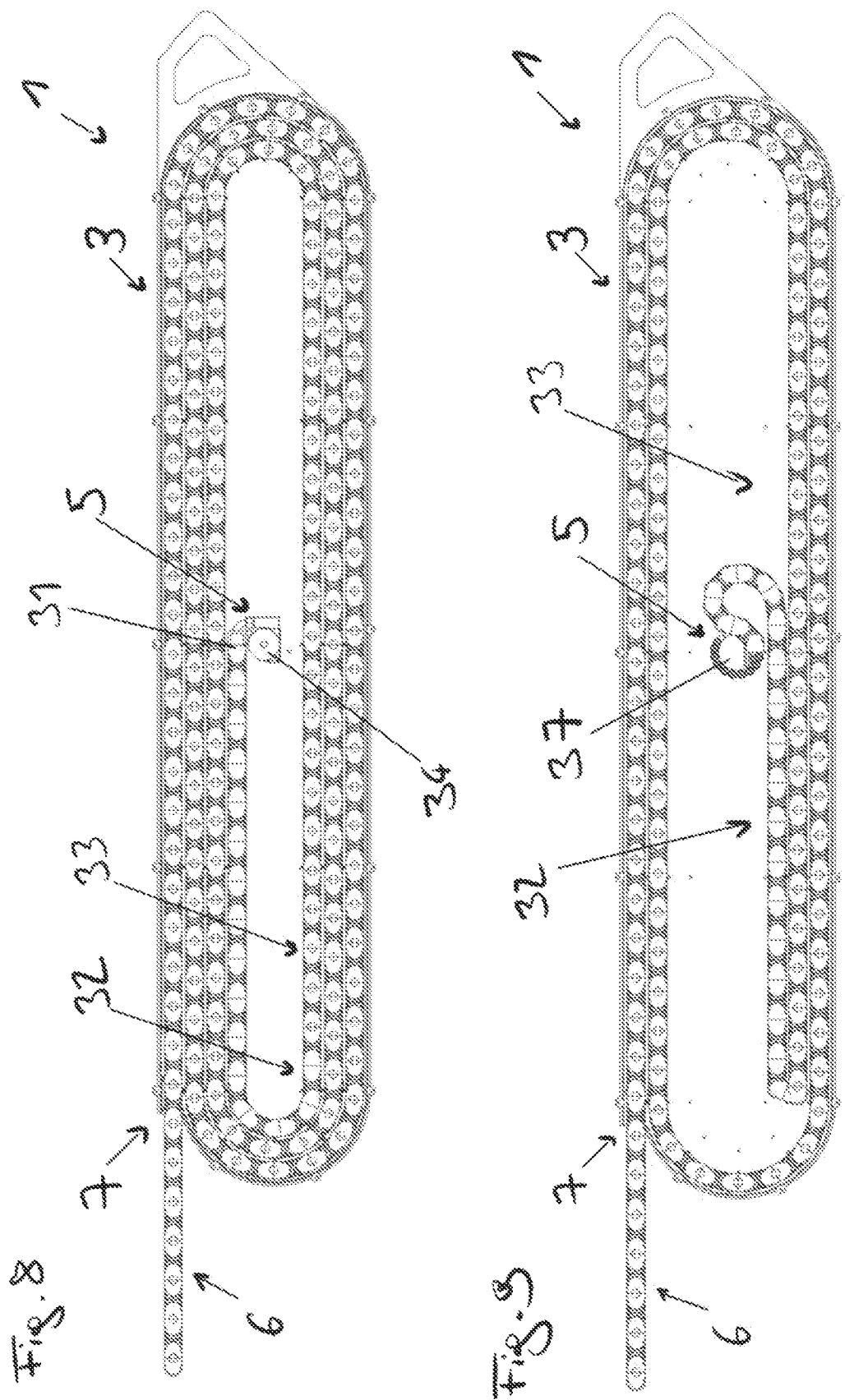

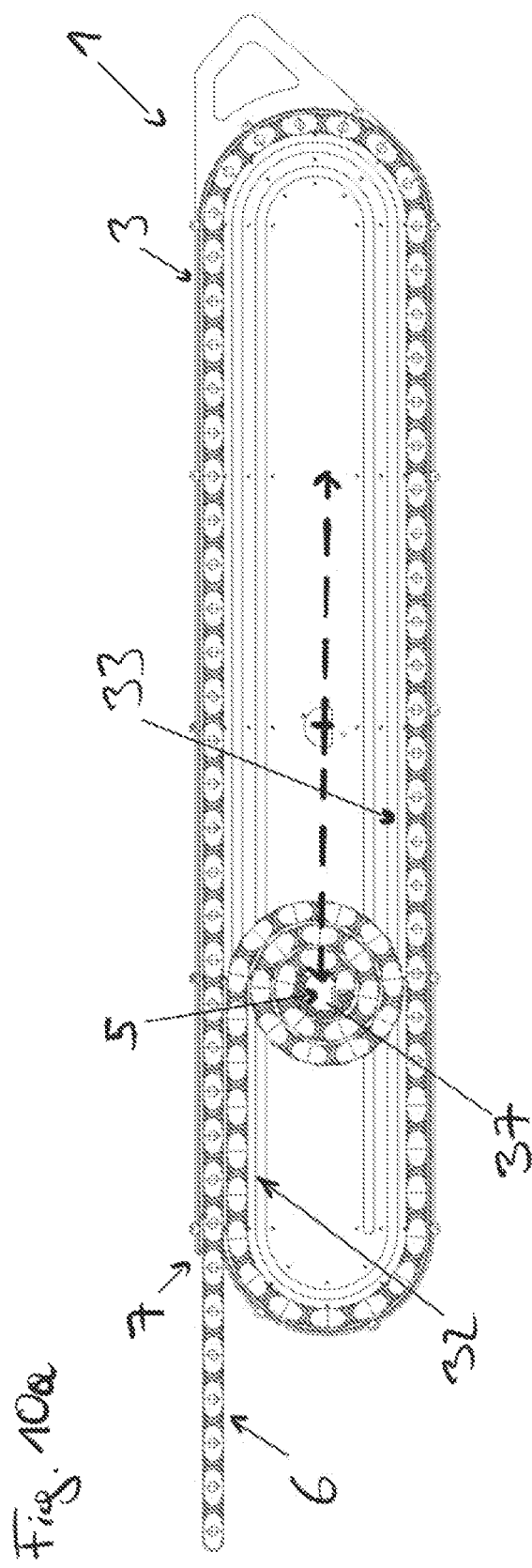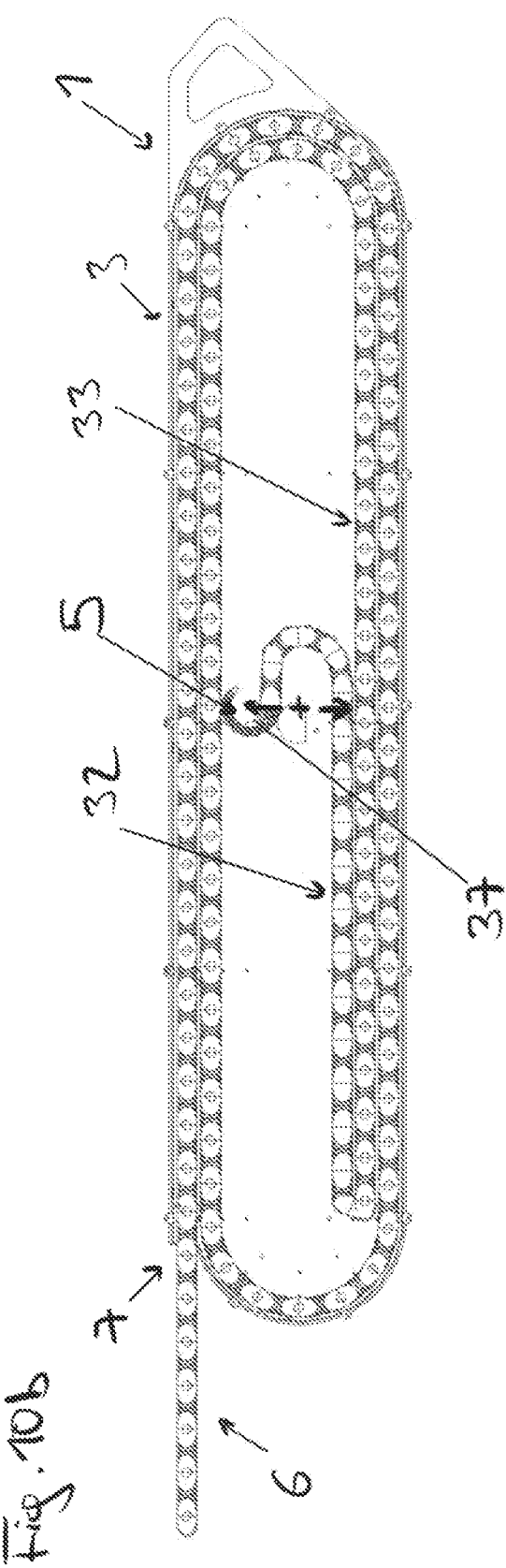

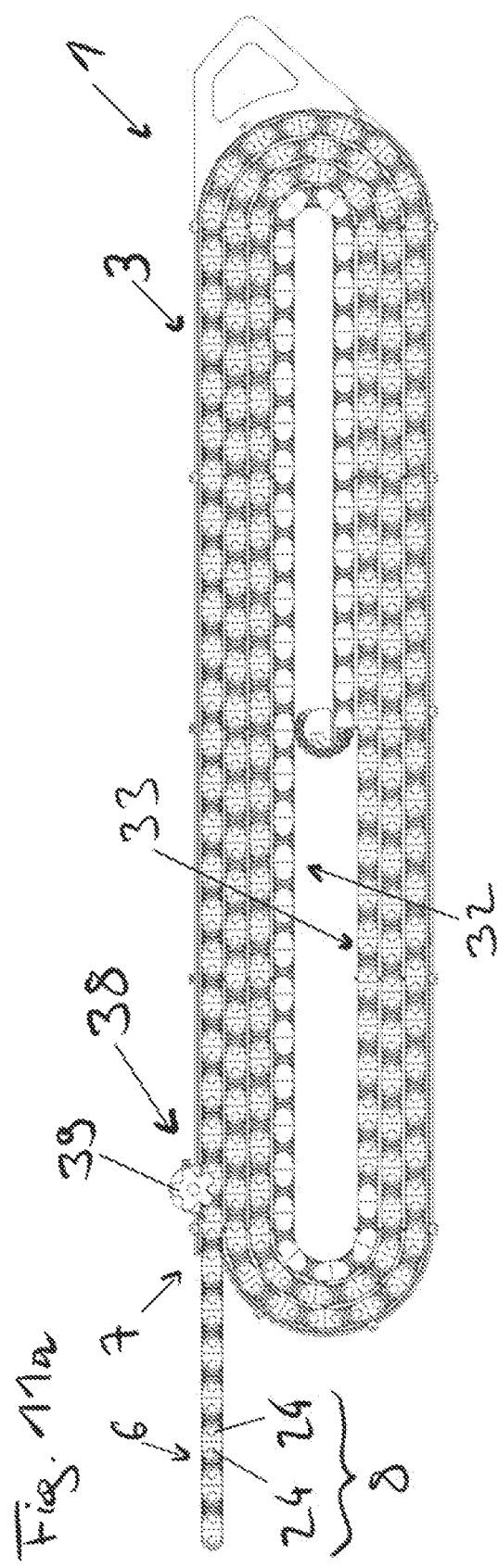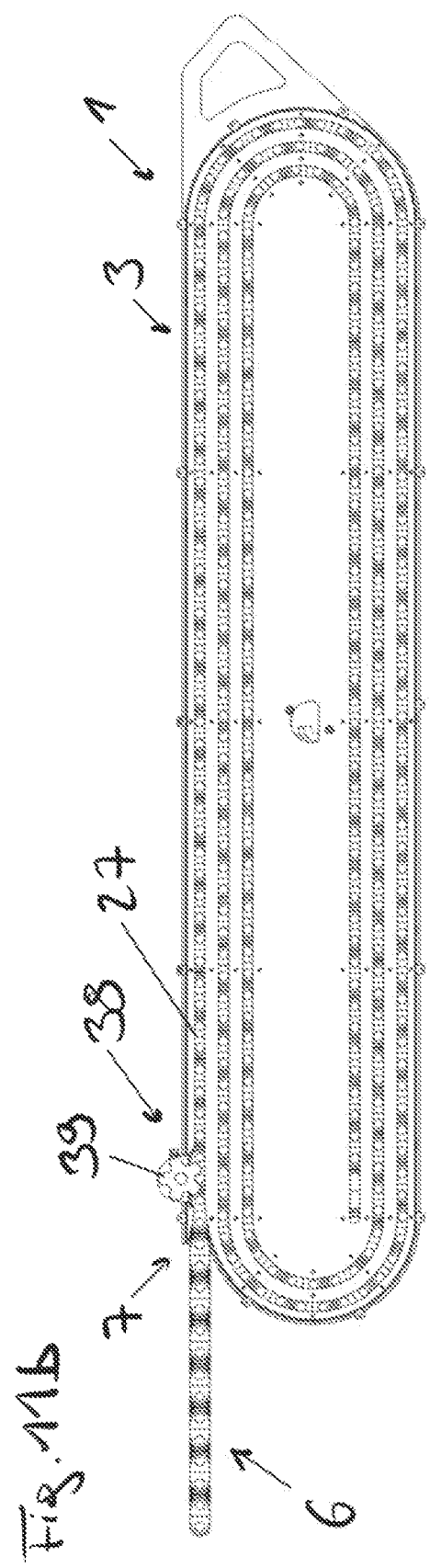

ENERGY SUPPLY SYSTEM

BACKGROUND OF THE INVENTION

The present invention relates to an energy supply system.

A generic energy supply system is known, for instance, from EP 2 610 208 A1. In a variant shown in FIGS. 12 to 15, the carrier is guided in a guide device, wound onto or unwound from a winding device. The guide device has transport discs with several concentric tracks arranged in steps. The carrier has sections with different widths, which can be wound onto or unwound from the stepped tracks according to the width, in which the winding takes place from the innermost track to the outermost track. A track change between the tracks takes place through the ramps connecting the tracks and the changing width of the carrier.

However, such an energy supply system has some disadvantages. For example, the carrier is designed in a very complex way. Winding devices with different intake capacities require specifically designed carriers in each case. Furthermore, the height of the winding at the outlet of the winding device varies in each case by the winding layer.

SUMMARY OF THE INVENTION

It is an object of the invention to provide an improved energy supply system without the disadvantages discussed above.

The energy supply system comprises a line storage for winding and unwinding of at least one energy line around a winding center of the line storage.

The line storage can serve as a space-saving and orderly storage of a part of the energy line that is not taken out of the line storage.

Essentially, as a winding center, a centrally located point in the line storage can be understood, starting from which (or towards which) the at least one energy line can be wound in the line storage, running in one or more windings. Such a course can, for instance, be similar to a flat spiral or a helical line.

For the energy supply system, it can generally be provided that the at least one energy line enters into the line storage in the winding center, for instance through a suitable joint. It can thus be provided that the energy line enters into the line storage in the winding center, from there runs in sectionally guided windings to the opening, and exits from the line storage through the opening.

The energy supply system can be provided for a tool that can be fixed or is fixed to a hoist.

The energy supply system can generally allow relative movement of the tool (or in general a free end of the energy line) towards the line storage. The tool can remain connected to the energy line during the movement. The length of the section of the energy line taken from the line storage can be adapted to the relative movement between the tool and the line storage by winding up and unwinding the at least one energy line into the line storage or out of it.

The at least one energy line can comprise at least one hydraulic supply line and/or at least one electrical supply line.

For the energy supply system, at least one carrier is provided for the at least one energy conducting line. The energy line can be arranged in the carrier (in other words, the carrier can embrace the energy line), so that winding and unwinding the energy line in the line storage is carried out by winding and unwinding the carrier. The carrier may conceivably be formed by a sheath of the line or lines.

The line storage comprises an opening for the inlet and outlet of the carrier and the energy line. A section of the carrier can thus be brought into the line storage through the opening or partially be removed from the line storage through the opening.

The carrier (and thus the energy line) of the energy supply system according to the invention can be guided by guide means via guide sections and guide arches to the winding center of the line storage for guiding the carrier section by section in the line storage.

The carrier can generally have a section with guide means and a section without guide means.

Here, a first guide section and a first guide arch adjoining it, and a second guide section and a second guide arch adjoining it, whereas the second guide section is adjoining the first guide arch, and further a third guide section adjoining the second guide arch, lying further inwards compared to the first guide section relative to the winding center, are provided.

The first guide section and the second guide section can essentially have the same distance (measured for instance as normal distance) to the winding center.

The first guide arch and the second guide arch can essentially have the same distance (for instance measured as the standard distance of the center of curvature) to the winding center.

The first guide section and the second guide section can, relative to the winding center, be arranged facing each other.

The first guide arch and the second guide arch can, relative to the winding center, be arranged facing each other.

If necessary, further guide arches and guide sections can be provided. So, a third guide arch can for instance be provided, which adjoins the third guide section, and is located further inwards relative to the winding center compared to the first guide arch, and which is adjoined by a fourth guide section located further inwards relative to the winding center compared to the second guide section. It should not be ruled out that even further guide arches and guide sections are provided.

The guide sections and guide arches can form a guide track, and the guide track can have an essentially spirally winding course from the opening towards the winding center, narrowing (thus, essentially with a decreasing radius of curvature) in the direction of the winding center.

By such an arrangement of guide sections and guide arches, it can be achieved that these have an essentially spiral course from the opening towards the winding center, and the at least one carrier can be wound and unwound section by section and essentially spirally in the line storage towards the winding center.

In other words, such an arrangement of guide arches and guide sections can have an essentially narrowing (more tightly wound), spiral course starting from the opening of the line storage towards the winding center of the line storage.

In this way, a sectional, essentially spiral, multi-layered and concordant (with the same winding sense) winding and unwinding of the carrier (and thus of the energy line) in the line storage can be achieved.

Because of the guide arches and guide sections and the corresponding guide means, the line storage itself can be formed with essentially no movable parts.

By means of the guide arches and guide sections and the corresponding guide means, the occurring forces can be spread in a better way. This can minimize wear.

The guide arches and guide sections and corresponding guide means can allow a gliding movement of the carrier relative to the guide arches and guide sections.

A connection of a guide section to a guide arch (or vice versa) does not have to be direct, uninterrupted or immediate. In an exemplary embodiment of the guide sections and guide arches in the form of webs or recesses, there can be a certain gap or discontinuity, for example, between a guide arch and a subsequent guide section. However, such a gap or discontinuity is to be measured in such a way that a guidance of the carrier with its guide means is ensured.

The third guide section, relative to the winding center compared to the first guide section, is arranged lying further inwards. For instance, the first guide section and the third guide section, relative to the winding center, can be arranged facing each other, and the third guide section is located closer to the winding center.

The guide sections and also the guide arches, in particular the first and third guide section, can be arranged and spaced in such a way that a carrier wound thereon does not touch itself between adjacent guide sections or guide arches. This can lead to a reduction in the frictional forces that occur.

The guide arches and guide sections and the corresponding guide means can subject the carrier to forced guidance in sections in the line storage.

The guide arches and guide sections and the corresponding guide means can be used to guide the carrier in sections in the line storage in a shearing-resistant manner. When a tensile or thrust force is applied to the carrier in the direction of the carrier, it can be moved along the guide arches and guide sections. The guide arches and guide sections and the corresponding guide means can engage in such a way that only a movement of the carrier along the guide arches and guide sections is possible. This can prevent buckling and thus being wound an unwound in a disorderly manner.

The carrier can be in the form of at least one sheath of the energy line or in the form of at least one chain with chain links connected to each other in a jointed manner. Such chains are known in the prior art as energy chains or also as energy guiding chains. The at least one energy line can be arranged in an inner part of the chain.

The carrier can be essentially freely bendable or windable in at least one direction.

In one embodiment of the carrier as a sheath of the power line, the carrier can have a certain transverse stiffness, but can be bent to a certain minimum bend radius and thus can be wound.

In one embodiment of the carrier as a chain, the carrier can be freely bendable or windable in at least one direction (for example, at least in the sense of winding) essentially up to a certain minimum bend radius. Bending or winding in certain directions can be suppressed by self-locking of the chain.

In one embodiment of the invention, it can be provided that the guide means of the carrier are formed as axial projections protruding from at least a part of the carrier, in particular from the sheath or a part of the chain links.

Axial protrusion can generally be understood as a protrusion transverse to the longitudinal extent of the carrier. The axial protrusions can be provided with rollers or friction-reducing coatings to reduce friction. The protrusions can be cylindrical or web-shaped.

The line storage can have at least one planar carrier plate, and the guide arches and guide sections can be formed in the carrier plate in the form of a guide track corresponding to the guide means of the carrier. The guide track can be in the form of a step, a groove or a recess in the carrier plate. The guide track can be continuous or in sections, i.e. as a series of individual sections.

In one embodiment of the invention, it is conceivable that the guide track is formed as a single continuous groove or recess in the at least one carrier plate of the line storage.

In a further embodiment of the invention, the guide means of the carrier can be formed as a guide track in the form of a plurality of individual guide tracks in at least a part of the sheath or at least a part of the chain links. The individual guide tracks can for instance be formed as grooves or recesses in the carrier.

The guide arches and guide sections can have the form of an arrangement or sequence of protrusions protruding from the carrier plate.

Protruding from the carrier plate can generally be understood as a protrusion from the plane of the carrier plate. The protrusions can be provided with rollers or friction-reducing coatings to reduce friction. The protrusions can have a cylindrical or web-like shape.

For the energy supply system, in a further embodiment of the invention:
the carrier has an outer, first end and an inner, second end, and
the carrier has a section with guide means and a section without guide means, and the section without guide means extends from the second end to the section with guide means, and
the carrier is connected to the winding center at the second end of the carrier, and the section without guide means is unguided in the line storage.

In other words, the carrier in the line storage has a guided section and an unguided section. The guided section can essentially extend from the opening of the line storage over the guide sections and guide arches to the end of the section of the carrier with guide means or to the beginning of the section of the carrier without guide means, respectively. The unguided section can extend from there to the winding center.

The carrier can also have guide means outside the line storage.

The first end of the carrier can be arranged on the section of the carrier taken from the line storage.

An unguided section can generally be understood as a section of the carrier that is not guided by guide arches or guide sections and corresponding guide means. Such an unguided section can be similar to a drag chain.

For this embodiment, the unguided section of the carrier can be wound essentially in a spiral manner about the winding center, and that the winding radius of the unguided section of the carrier increases or decreases as the guided part of the section with guide means of the carrier is wound up and down. An increase or decrease in the winding radius of the unguided section can be the case when transitioning to a loose or tight winding.

Here, it can be possible that the energy line enters into the line storage in the winding center through a non-rotary joint. The winding of the unguided section with a second end held non-rotary in the winding center, resulting from winding and unwinding of the guided part of the section with guide means of the carrier, for which in other embodiments, a technically complex rotary joint is provided, can be permitted by an essentially spiral winding around the winding center and an increasing or decreasing winding radius. The space in the line storage occupied or vacated by the winding or unwinding of the unguided section can be made available or filled by the guided part of the carrier moving out of or into the line storage.

Alternatively, for this embodiment, a rotary joint is provided for the energy line in the winding center. The torsion of the unguided section resulting from winding and unwinding of the guided section of the carrier can be permitted or prevented by connecting the second end of the carrier to the rotary joint.

As a further alternative, but also in combination with the essentially spiral winding described above, it can be provided that the unguided section of the carrier can be wound and unwound in opposing layers about the winding center when the guided section of the carrier is wound and unwound. The movement of the unguided section of the carrier can resemble a two-layer folded drag chain, which can be wound in a sliding arrangement around the winding center.

When winding the unguided section of the carrier around the winding center, it can generally be provided that the unguided section is supported on and slides along the section of the carrier guided at the guide sections and guide arches. In particular, this can be the case with an increasing winding radius (transition to a loose winding) of the unguided section of the carrier as the guided section is wound up. In particular, this can be the case with an increasing winding radius (transition to a loose winding) of the unguided section of the carrier as the guided section is wound up.

For the energy supply system, it can generally be provided that the distance of the guide arches to each other is essentially invariable.

Winding and unwinding of the carrier (and thus of the energy line) into or out of the line storage can be carried out along a fixed guide track, which can be predetermined, or a predetermined guide track formed by the guide sections and guide arches.

For the energy supply system, the guide arches can have an essentially 180 degree winding angle and/or the guide arches have equal and/or different radii of curvature, and the guide arches with different radii of curvature have a decreasing radius of curvature from the opening of the line storage towards the winding center, and/or the respective radius of curvature of a guide arch is constant.

The guide arches can each be semicircular in shape.

Groups of guide arches with different radii of curvature, which have a decreasing radius of curvature from the opening of the line storage to the winding center, can be arranged concentrically. The grouping can, for instance, be made on opposite sides relative to the winding center.

For the energy supply system, it can generally be provided that the respective guide sections have an essentially straight course and/or essentially the same longitudinal extent.

For the energy supply system, it can generally be provided that the line storage has an essentially elongated shape with a greater longitudinal extent than transverse extent, and the guide sections extend essentially along the longitudinal extent of the line storage.

An elongated shape of the line storage can optimize the length of the energy line that can be wound and unwound in or out of the line storage.

The line storage can, for instance, have an essentially rectangular shape, in which the guide arches are arranged on the short sides of the rectangle and the guide sections are arranged along the long sides of the rectangle.

For the energy supply system, it can generally be provided that the winding and unwinding of the at least one carrier takes place essentially in one plane. This can enable crossing-free winding of the carrier.

For the energy supply system, the inlet and outlet of the at least one carrier through the opening takes place at a fixed position of the line storage. This can be achieved by the first guide section being located adjacent to the opening.

In energy supply systems known in the prior art, the position of the inlet and outlet to or from the line storage changes with the length of the carrier wound or unwound in the line storage. In contrast, for the energy supply system according to the invention, it can be provided that this takes place at a fixed position of the line storage, which makes it easier to predict the course of the carrier taken from the line storage.

For the energy supply system, the at least one carrier has an essentially constant transverse extent. This can be used to easily adapt the carrier to the windable length in the line storage.

For the energy supply system, a drive acting on the at least one carrier can be provided for winding and unwinding the at least one carrier. The drive can be present in the form of one (or more) driven rollers or a driven gear wheel. The drive can have an energy storage, for example in the form of a spring, or a motor.

For the energy supply system, the position of the winding center in the line storage can be adjusted. For instance, the winding center can be arranged in the line storage so that it can be moved linearly.

For this, a drive can preferably be present. Preferably, the position of the winding center in the line storage can be designed to be linearly movable in the direction of and/or transverse to the guide sections.

By being able to adjust the position of the winding center in the line storage, the length of the unguided section of the carrier can be reduced.

Protection is also requested for hoist, in particular a crane, with an energy supply system as previously described.

The hoist can comprise a tool, and the energy supply system can allow a relative movement of the tool to the line storage. The tool can remain connected to the energy line during the movement, and the length of the section of the energy line taken from the line storage can be adapted to the relative movement between the tool and the line storage.

With such a hoist, the energy supply system can be attached to an outrigger, for instance an arm of an arm system, of the hoist.

Advantageously, the energy supply system can be arranged on an inner outrigger, for instance the beginning of a telescopable arm system, and a tool supplied by the energy supply system can be arranged on an outer outrigger that is movable with respect thereto, for instance at the end of a telescopic outrigger of a telescopable arm system.

When the telescopic arm system is extended and retracted, the length of the section of the carrier taken from the line storage, and thus of the energy line, can be adapted to the relative movement between the tool and the line storage.

Other applications of the energy storage device according to the invention, such as for CNC machining centers, industrial robots, or general moving machine parts, are also imaginable.

BRIEF DESCRIPTION OF THE INVENTION

Embodiments according to the invention are discussed with reference to the figures. They show:

FIG. 1 an energy system arranged on an outrigger in a first embodiment,

FIG. 2 an energy storage according to a second embodiment in isolation,

FIG. 3 an energy storage according to the first embodiment in isolation,

FIG. 4 a further view of an energy storage according to the first embodiment in isolation, FIGS. 5a to 5j cross-sectional views of a winding or unwinding process of the carrier from or into the line storage of an energy storage according to the first embodiment, FIG. 6 a cross-section through an energy storage according to the first embodiment, FIGS. 7a, 7b, 7c schematic illustrations of different embodiments of the carrier and the guide of the carrier, FIG. 8 an embodiment of the energy storage with a rotary joint, FIG. 9 an embodiment of the energy storage with a multi-layer, counter-rotating winding of the unguided part of the carrier, FIGS. 10a and 10b embodiments of the energy storage with movable winding centers, FIGS. 11a and 11b an embodiment of an energy storage with a drive, and FIGS. 12a to 12d views to a hoist with an energy guide.

DETAILED DESCRIPTION OF THE INVENTION

FIG. 1 shows an energy supply system 1, which is arranged with a housing 20, which accommodates the line storage 3, on an inner outrigger 36 of a hoist not shown here in more detail (see FIGS. 12a to 12d). The carrier 6, which can be wound or unwound in or out of the line storage 3, is attached on a first end 30 to an outer outrigger 40, which is movable relative to the line storage 3.

FIG. 2 shows in isolation an embodiment of an energy supply system 1 with a line storage 3 arranged in a housing 20, from the opening 7 of which a part of the carrier 6 is taken. In this embodiment, the carrier 6 is formed by a chain 22 with chain links 23, on which guides 8 are arranged in the form of two axially protruding protrusions 24 per chain link 23. In this embodiment, the line storage 3 has an elongated, approximately rectangular shape. This embodiment of the carrier 6 is also shown in the embodiment of the energy storage 1 of FIGS. 11a and 11b.

In FIG. 3, a further embodiment of an energy supply system 1 is shown in isolation, in which the energy supply system 1 again has a line storage 3 arranged in a housing 20, from the opening 7 of which a part of the carrier 6 is taken. In this embodiment, the carrier 6 is formed by a chain 22 with chain links 23, on which guides 8 are arranged in the form of an axially protruding protrusion 24 for each chain link 23. The carrier plate 26 of the line storage 3 has been made visible in this embodiment by partially blanking out the lid of the housing 20.

FIG. 4 shows a view of FIG. 3 in which the lid of the housing 20 has been completely banked out. The carrier 6 is guided for at least one energy-carrying line (not visible here, see FIGS. 5a-5j and FIG. 6) for the inlet and outlet of the carrier 6 through the opening 7 of the line storage 3, for guiding the carrier 6 and the energy line in sections in the line storage 3 with the help of guides 8 via a first guide section 9 through a first guide arch 10, and via a second guide section 11 adjoining the first guide arch 10 through a second guide arch 12, and via a third guide section 13 adjoining the second guide arch 12, which is lying further inwards relative to the winding center 5 (see also FIG. 5a) compared to the first guide section 9—and, analogous to this, via further guide sections 15, 17 and guide arches 14, 16, 18—is guided to the winding center 5 of the line storage unit 3. The further course of the carrier 6 between the end of the innermost guide section 18 and the winding center 5 is shown with dashed lines in FIG. 4 and can be seen in detail in FIG. 5a.

The third guide section 13 is lies further inwards compared to the first guide section 9 relative to the winding center 5. The first guide section 9 and the third guide section 13 are arranged opposite each other relative to the winding center 5, and the third guide section 13 is located closer to the winding center 5.

Moreover, a third guide arch 14 is shown, which adjoins a further inwards lying third guide section 13 compared to the first guide arch 10 relative to the winding center 5, to which a fourth guide section 15 adjoins, lying further inwards, compared to the second guide section 11 relative to the winding center 5. The same applies to the further guide arches 16, 18 and the further guide sections 17, 19. It should not be ruled out that, different to what is shown, further guide arches and guide sections are provided in addition to those shown.

In the embodiment shown, the guide sections 9, 11, 13, 15, 17, 19 and guide arches 10, 12, 14, 16, 18 form a guide track 27, and the guide track 27 comprises an essentially spirally-wound course from the opening 7 towards the winding center 5, narrowing in the direction of the winding center 5.

It can be further seen in the embodiment shown that
the guide arches 10, 12, 14, 16, 18 essentially have a winding angle of 180 degrees, and that
the guide arches 10, 14, 18 or the guide arches 12, 16, respectively, have different radii of curvature, and the guide arches 10, 14, 18 and the guide arches 12, 16, with different radii of curvature, respectively, have a decreasing radius of curvature from the opening 7 of the line storage 3 towards the winding center 5, and that
the respective radius of curvature of a guide arch 10, 12, 14, 16, 18 is constant.

In the embodiment shown, the guide arches 10, 12, 14, 16, 18 are each formed in an essentially semicircular shape.

Groups of guide arches 10, 14, 18 and 12, 16 with different radii of curvature, which have a decreasing radius of curvature from the opening 7 of the line storage 3 towards the winding center 5, are arranged concentrically in the embodiment shown. The grouping of the guide arches 10, 14, 18 and 12, 16 is arranged on opposite sides relative to the winding center 5.

In the embodiment shown, the guide sections 9, 11, 13, 15, 17, 19 have an essentially straight course and essentially the same longitudinal extent.

In the embodiment shown, the line storage 3 comprises an essentially elongated shape with a greater longitudinal extent than transverse extent, and the guide sections 9, 11, 13, 15, 17, 19 essentially extend along the longitudinal extent of the line storage 3.

The sequence of FIGS. 5a to 5j shows an unwinding of the carrier 6 from the line storage 3 according to the embodiment of FIG. 4. In reverse order, the figures show a winding of the carrier 6 into the line storage 3.

FIG. 5a shows a line storage 3 which is essentially completely wound up. The guided part of the section 33 of the carrier 6 with guide means 8 extends essentially over the entire length of the guide track 27 formed by the guide sections 9, 11, 13, 15, 17, 19 and guide arches 10, 12, 14, 16, 18.

FIG. 5j shows a line storage 3 that is essentially completely unwound. The guided part of the section 33 extends essentially over the minimum length of the guide section 9 adjoining the opening 7. The unguided section 32 has been essentially completely wound around the winding center 5 due to the non-rotary joint 37.

Except for the length of the part of the carrier 6 removed from the line storage 3, only the carrier plate 26 shown in FIG. 4 is blanked out in FIGS. 5a to 5j compared to FIG. 4. It can be seen that the line storage 3 has at the rear (in the view of FIGS. 5a to 5j located behind the carrier 6 in perspective) a further (second) carrier plate 26, which in turn has respective guide sections 9, 11, 13, 15, 17, 19 and guide arches 10, 12, 14, 16, 18. The carrier 6 is guided in sections along the guide sections 9, 11, 13, 15, 17, 19 and guide arches 10, 12, 14, 16, 18 to the winding center 5 of the line storage 3. The carrier 6 is guided on both sides by the presence of the two carrier plates 6 (see also FIGS. 7a to 7c). However, this does not have to be so, since a single-sided guidance is also conceivable.

In the embodiment shown, the guide track 27 is formed as a single continuous groove in the carrier plate 26 of the line storage unit 3.

The guide sections 9, 11, 13, 15, 17, 19 and guide arches 10, 12, 14, 16, 18 are arranged and spaced in such a way that the carrier 6 wound thereon does not touch itself between adjacent guide sections 9, 11, 13, 15, 17, 19 and guide arches 10, 12, 14, 16, 18.

The carrier 6 has a section 32 with guides 8 and a section 33 without guides. The section 33 without guides extends from the second end 31 of the carrier 6 to the beginning of the section 32 with guides 8, at which the first guide 41 of the guided part of the section 32 with guides 8 is arranged.

The carrier 6 is connected to the winding center 5 at the second end 31 of the carrier 6. The section 33 without guide means runs unguided in the line storage 3, i.e. it is not guided by the guide sections 9, 11, 13, 15, 17, 19 and guide arches 10, 12, 14, 16, 18.

In other words, the carrier 6 in the line storage 3 has a guided section 33 with guides 8 and an unguided section 32 without guides. The guided part of the section 33 extends essentially from the opening 7 of the line storage 3 via the guide sections 9, 11, 13, 15, 17, 19 and guide arches 10, 12, 14, 16, 18 to the end of the section 33 of the carrier 6 with guides 8 and to the beginning of the section 32 of the carrier 6 without guides 8, respectively. The unguided section 32 extends from there to the winding center 5.

In the embodiment shown in FIGS. 5a to 5j, the unguided section 32 of the carrier 6 can be windable essentially spirally around the winding center 5, and the winding radius of the unguided section 32 of the carrier 6 can increase or decrease as the guided part of the section 33 is wound and unwound by guides 8 of the carrier 6. An increase-such as in the transition from FIGS. 5b to 5a—or decrease—such as in the transition from FIGS. 5a to 5b—in the winding radius of the unguided section 32 can be the case in a transition to a loose (wind) or tight (unwind) winding.

In the embodiment shown, at least one energy line 4 enters into the line storage 3 at the winding center 5 through a non-rotary joint 37. The carrier 6 connects the non-rotary joint 37 tangentially in the direction of the guide sections 9, 11, 13, 15, 17, 19. The winding of the unguided section 32 resulting from winding and unwinding of the guided part of the section 33 with guides 8 of the carrier 6 with a second end 31 held non-rotating in the winding center 5, for which alternatively in the embodiment of FIG. 8 a rotary joint 34 is provided, can be permitted by an essentially spiral winding of the section 32 around the winding center 5 and an increasing or decreasing winding radius. The space in line storage 3 occupied or vacated by winding or unwinding of the unguided section 32 can be made available or filled by the guided part of the carrier 6 leaving or entering into the line storage 3 (in particular, compare FIGS. 5a and 5j).

When the unguided section 32 of the carrier 6 winds around the winding center 5, the unguided section 32 is supported by and slides along the section 33 of the carrier 6 guided on the guide sections 9, 11, 13, 15, 17, 19 and guide arches 10, 12, 14, 16, 18. In particular, this is the case when the winding radius of the unguided section 32 increases (transition to a loose winding) as the section 33 coils up.

In the course of FIG. 5a to FIG. 5j, when the carrier 6 is removed from the line storage 3, the first guide 41 of the guided part of the section 32 moves from the innermost guide section 19 along the guide track 27 formed by the guide sections 9, 11, 13, 15, 17, 19 and guide arches 10, 12, 14, 16, 18 towards the opening 7. An outlet of the carrier 6 from the line storage 3 takes place at a fixed position.

The carrier 6 can be guided in sections in the line storage 3 in a shearing-resistant manner by the guide sections 9, 11, 13, 15, 17, 19 and guide arches 10, 12, 14, 16, 18 and the corresponding guides 8. When a tensile or thrust force is exerted on the carrier 3 in the direction of the carrier 6, the latter can be moved along the guide sections 9, 11, 13, 15, 17, 19 and guide arches 10, 12, 14, 16, 18 in a guided manner. The guide sections 9, 11, 13, 15, 17, 19 and guide arches 10, 12, 14, 16, 18 and the corresponding guides 8 intertwine in such a way that only one movement of the carrier 6 along the guide sections 9, 11, 13, 15, 17, 19 and guide arches 10, 12, 14, 16, 18 is possible. This can prevent the carrier 6 from buckling, and thus from being wound and unwound in a disorderly manner.

In FIG. 6, a cross-section through the energy storage 1 according to the embodiment of FIG. 5a is shown.

Thereby, several energy lines 4 arranged inside the carrier 6 are visible. In the section 33 with guides 8, the carrier 6 has axial protrusions protruding from the carrier 6 with rollers 25 positioned thereon, which engage in the guide sections 9, 11, 13, 15, 17, 19 and guide arches (not visible here) in the carrier plate 6. The unguided section 32 without guides is not guided by the guide sections and guide arches.

It is visible that winding and unwinding of the carrier 6 takes place essentially in a plane parallel to the carrier plate 6. It is also visible that the carrier 6 has an essentially constant transverse extent (width).

FIG. 7a schematically shows an embodiment of the carrier 6 in which the carrier 6 has protrusions 24 protruding axially from it, which engage in a groove-shaped guide track 27 of the carrier plate 26 of the line storage 3. Energy lines 4 are arranged inside the carrier 6. This embodiment essentially corresponds to that of FIGS. 5 and 6.

FIG. 7b schematically shows an embodiment of the carrier 6, in which the carrier 6 is designed in the form of a sheath 21 of the energy line 4. A guide of the carrier 6 is designed analogously to the embodiment of FIG. 7b with axially protruding protrusions 24 and a guide track 27.

FIG. 7c schematically shows an embodiment of the carrier 6 in which the guide of the carrier 6 is formed as a guide track 28, here in the form of a groove, in at least part of the carrier 6, and the guide arches and guide sections are formed in the form of an arrangement of protrusions 29 protruding from the carrier plate 6. When the carrier 6 is formed as a chain with chain links, the guide track 28 can be formed in the form of guide tracks arranged in a row in individual chain links. The arrangement of protrusions 29 protruding from the carrier plate 6 can be fashioned after the course of the guide track 27 formed by the guide tracks 9, 11, 13, 15, 17, 19 and guide arches 10, 12, 14, 16, 18 of the embodiment of FIGS. 5 and 6. An embodiment of the carrier 6 in the form of a sheath 21 of the energy line 4 analogous to the schematic illustration of FIG. 7b is also conceivable.

FIG. 8 shows an embodiment of the energy storage 1 analogous to the embodiment of FIG. 5, in which, in contrast to the embodiment of FIG. 5, a rotary joint 34 is provided in the winding center 5. The torsion of the unguided section 32, described as for the embodiment of FIG. 5, resulting from wound and unwound of the guided section 33 of the carrier 6, can here be allowed or prevented by connecting the second end 31 of the carrier 6 to the rotary joint 34.

Since here, when the carrier 6 is removed from the line storage 3, there is no spiral winding of the unguided section 32 around the winding center 5, the longitudinal extent of the unguided section 32 can be formed to be shorter. The transverse extent of the line storage 3 can also be shorter.

FIG. 9 shows an embodiment of the energy storage 1 analogous to the embodiment of FIG. 5. Here, a non-rotary joint 37 is also provided in the winding center 5, though in contrast to the embodiment of FIG. 5, the unwound section 32 of the carrier 6 can be wound and unwound in reverse layers about the winding center 5 when the guided section 33 of the carrier 6 is wound and unwound. As the carrier 6 progressively unwinds from the line storage 3, or at the beginning of winding the carrier 6 in the line storage 3, an essentially spiral winding of the unguided section 32 about the winding center 5 can take place.

FIG. 10a shows an embodiment of an energy storage 1 in which the position of the winding center 5 in the line storage unit 3 can be adjusted. The adjustable range is shown by a dashed line. In FIG. 10a, the winding center 5 is arranged in the line storage 3 so as to be linearly movable in the direction of the guide sections 9, 11, 13, 15, 17, 19.

FIG. 10b shows an embodiment of an energy storage 1 in which the position of the winding center 5 in the line storage unit 3 can be adjusted. The adjustable range is again illustrated by a dashed line. In FIG. 10b, the winding center 5 is arranged in the line storage 3 so as to be linearly movable transversely to the guide sections 9, 11, 13, 15, 17, 19.

By an adjustability of the position of the winding center 5 in the line storage 3, it can be possible to reduce the length of the unguided section 33 of the carrier 6.

FIGS. 11a and 11b show a drive 38 acting on the carrier 6 for winding and unwinding the at least one carrier 6. The drive 38 has a gear wheel 39 which engages in the guide means 8 in the form of the protrusions 24 of the section 33 of the carrier 6 guided in the line storage 3. In this embodiment, the drive 38 acting on the carrier 6 with the gear wheel 39 is arranged adjacent to the opening 7 at the beginning of the guide track 27. An arrangement at another position of the guide track is also conceivable.

Figure 12B:
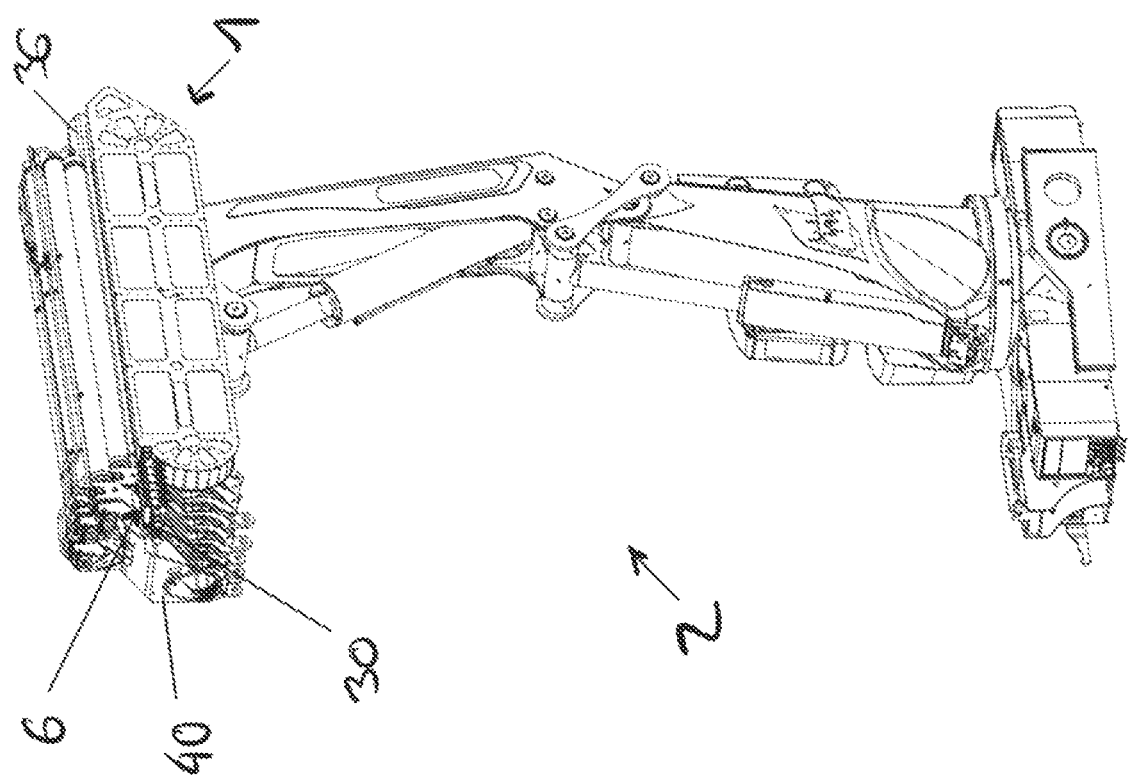
Figure 12C:
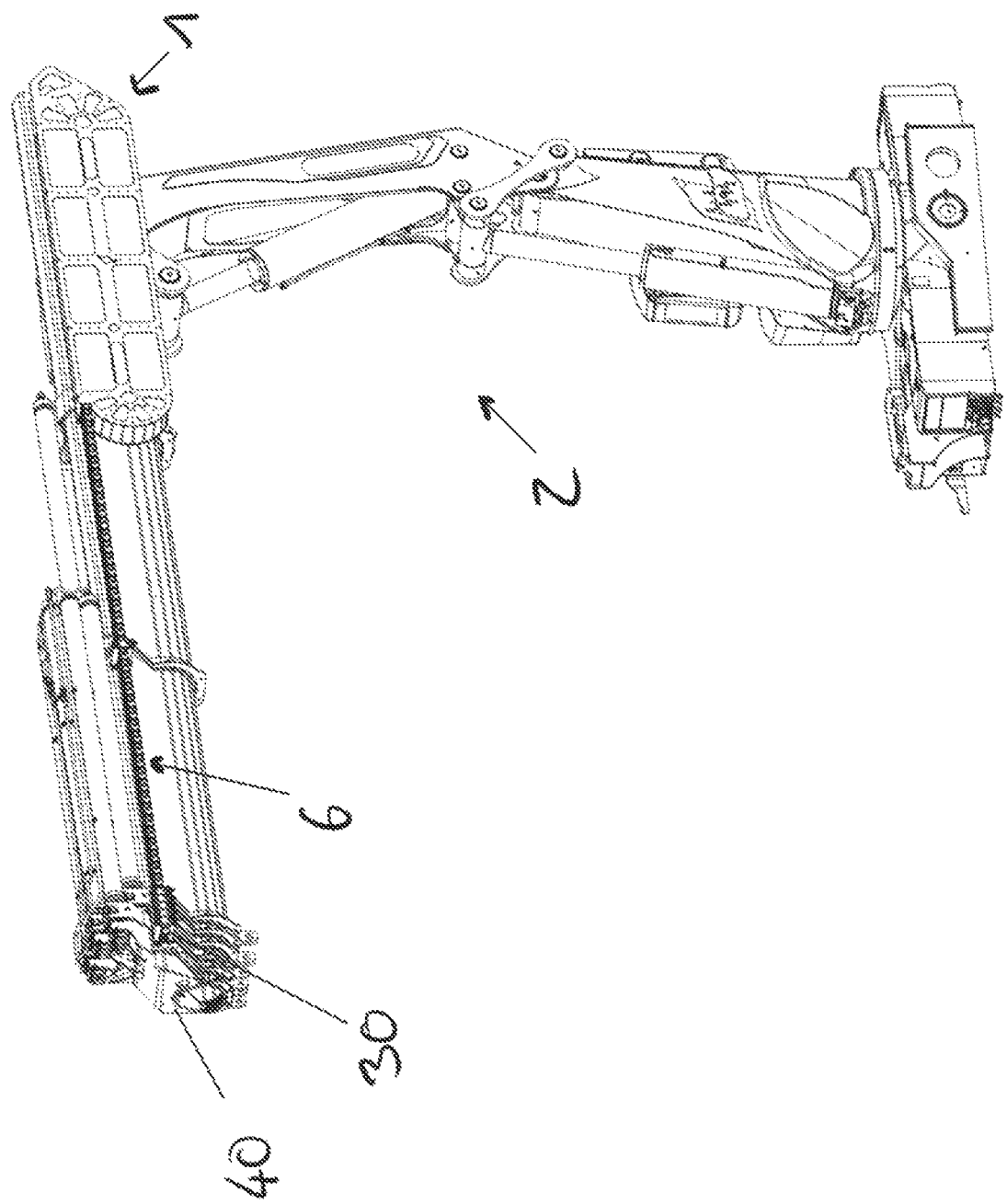
Figure 12C:
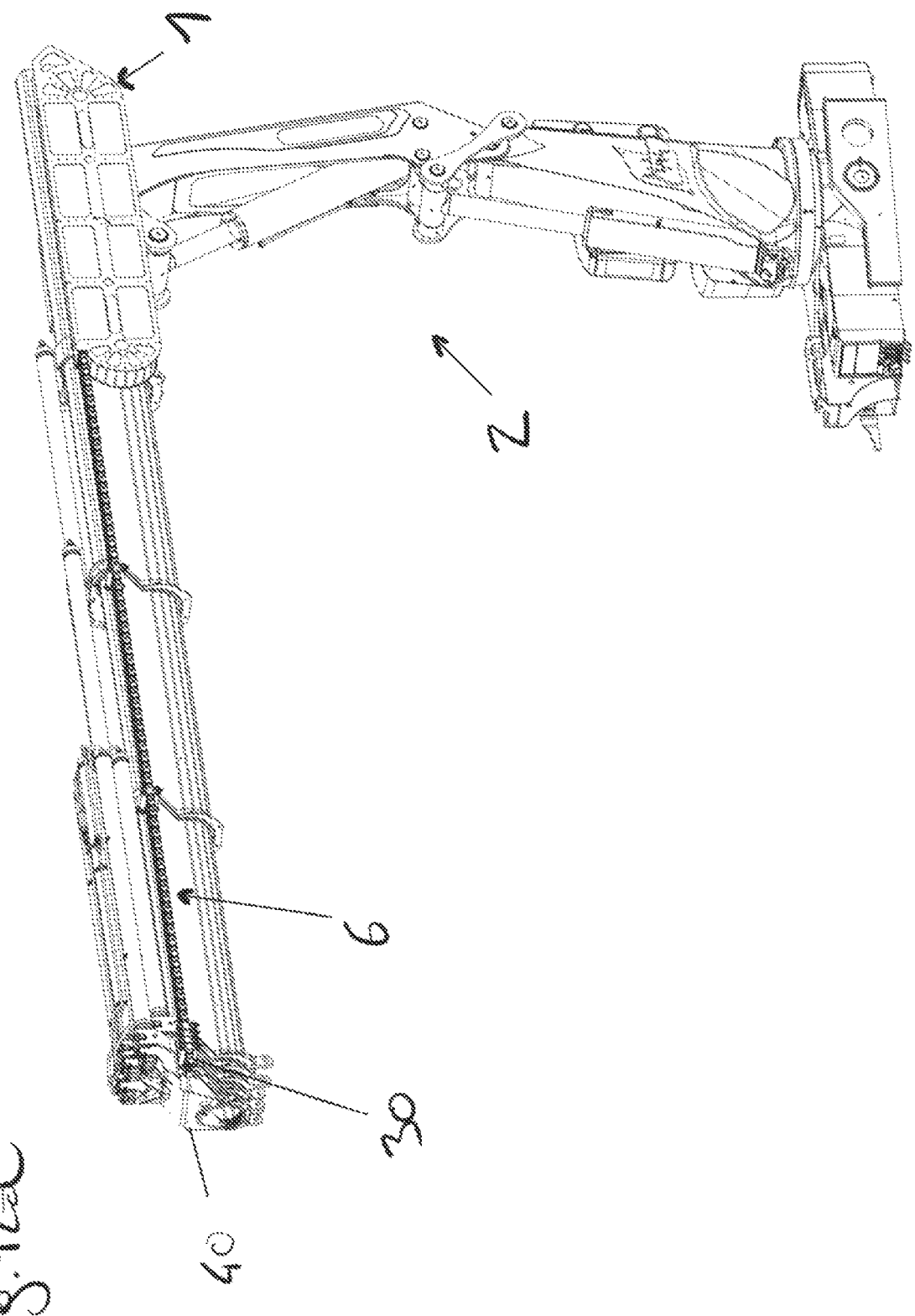

FIGS. 12a to 12c show a hoist 2 with an energy supply system 1.

The energy supply system 1 is attached with the housing 20 to an inner outrigger 36, for instance an arm of a telescopable arm system, of the hoist 2. A tool supplied by the energy supply system 1, not shown here, can be arranged on the outer outrigger 40 which is movable to it, for instance at the end of a telescopic outrigger of a telescopable arm system. The carrier 6 can thereby be connected with its first end 30 to the tool or the outer outrigger 40.

The energy supply system 1 can allow relative movement of the outrigger 40, and thus of the tool, towards the line storage 3. The tool can remain connected to the carrier 6 and the energy line 4 during the movement, and the length of the section of the carrier 6 and the energy line 4, taken from the line storage 3, can be adapted to the relative movement between the tool and the line storage 3.

LIST OF REFERENCE SIGNS 1 energy supply system
2 hoist
2 line storage
4 energy line
5 winding center
6 carrier
7 opening
8 guides
9 first guide section
10 first guide arch
11 second guide section
12 second guide arch
13 third guide section
14 third guide arch
15 fourth guide section
16 fourth guide arch
17 fifth guide section
18 fifth guide arch
19 sixth guide section
20 housing
21 cover
22 chain
23 chain link
24 projection guides
25 roller
26 carrier plate
27 guide track carrier plate
28 guide track cover
29 projection carrier plate
30 first end carrier
31 second end carrier
32 section with guides
33 section without guides
34 rotary joint
35 hoist
36 outrigger
37 non-rotary joint
38 drive
39 gear wheel
40 outrigger
41 first guide means

The invention claimed is:

1. An energy supply system for a tool attachable to a hoist, the energy supply system comprising:
 a line storage for winding and unwinding an energy line around a winding center of the line storage device;
 a carrier configured to carry the energy line, the line storage having an opening for intake and removal of the carrier and the energy line; and
 guides configured to guide the carrier through the opening so as to guide the carrier and the energy line in sections in the line storage to the winding center of the line storage via;
 a first guide section through a first guide arch, and
 a second guide section adjoining the first guide arch and through a second guide arch, and
 a third guide section adjoining the second guide arch and lying further inwards than the first guide section relative to the winding center,
 wherein the carrier has an outer, first end and an inner, second end, and wherein the carrier has a first section with guides and a second section without guides, the second section without guides extending from the second end to the first section with guides, wherein the carrier is connected to the winding center at the second end of the carrier, and the second section without guides is unguided in the line storage, and wherein the unguided section of the carrier is windable spirally around the winding center, and a winding radius of the unguided section of the carrier increases or decreases as the guided part of the section of the carrier is wound or unwound.

2. The energy supply system according to claim 1, wherein the carrier is configured as a sheath of the energy line, or as a chain with chain links connected to each other in a jointed manner.

3. The energy supply system according to claim 1, wherein:

the guides of the carrier are designed as axial protrusions protruding from the carrier, and the line storage has a planar carrier plate, and the guide arches and guide sections are configured as a guide track in the carrier plate, or the guides of the carrier are configured as guide tracks in the carrier, and the guide arches and guide sections are formed as an arrangement of protrusions protruding from the carrier plate.

4. The energy supply system according to claim 3, wherein:

the guide track is formed as a groove in the carrier plate, or the guide tracks are formed as grooves in the carrier.

5. The energy supply system according to claim 1, further comprising a rotary joint for the energy line in the winding center.

6. The energy supply system according to claim 1, wherein the distance of the first guide arch and the second guide arch from each other is invariable.

7. The energy supply system according to claim 1, wherein;

the first guide arch and the second guide arch have a winding angle of 180 degrees, and/or the first guide arch and the second guide arch have different radii of curvature with a decreasing radius of curvature from the opening of the line storage towards the winding center, and/or each of the first guide arch and the second guide arch has respective constant radius of curvature.

8. The energy supply system according to claim 1, wherein the first guide section, the second guide section, and the third guide section have a straight course and/or the same longitudinal length.

9. The energy supply system according to claim 1, wherein the line storage has an elongated shape with a greater longitudinal length than a transverse length, and the first guide section, the second guide section, and the third guide section run along a longitudinal axis of the line storage.

10. The energy supply system according to claim 1, wherein the line storage and the carrier are configured such that winding and unwinding of the carrier is in one plane.

11. The energy supply system according to claim 1, wherein the intake and removal of the carrier takes place through the opening at a fixed position of the line storage.

12. The energy supply system according to claim 1, wherein the carrier has constant constant transverse width.

13. The energy supply system according to claim 1, wherein the first guide arch, the second guide arch, the first guide section, the second guide section, and the third guide section have a spiral course from the opening towards the winding center, and the carrier is windable and unwindable in sections spirally in the line storage towards the winding center.

14. A hoist, in particular a crane, comprising the energy supply system according to claim 1.

15. The hoist according to claim 14, further comprising an outrigger, wherein the energy supply system is attached to the outrigger.

16. The energy supply system according to claim 1, wherein the guides are further configured to guide the carrier and the energy line in sections in the line storage to the winding center of the line storage via a plurality of additional guide arches in addition to the first guide arch and the second guide arch and via a plurality of additional guide sections in addition to the first guide section, the second guide section, and the third guide section.

17. An energy supply system for a tool attachable to a hoist, the energy supply system comprising:

a line storage for winding and unwinding an energy line around a winding center of the line storage device;

a carrier configured to carry the energy line, the line storage having an opening for intake and removal of the carrier and the energy line; and guides configured to guide the carrier through the opening so as to guide the carrier and the energy line in sections in the line storage to the winding center of the line storage via:

a first guide section through a first guide arch, and a second guide section adjoining the first guide arch and through a second guide arch, and a third guide section adjoining the second guide arch and lying further inwards than the first guide section relative to the winding center, wherein the carrier has an outer, first end and an inner, second end, wherein the carrier has a first section with guides and a second section without guides, the second section without guides extending from the second end to the first section with guides, wherein the carrier is connected to the winding center at the second end of the carrier, and the second section without guides is unguided in the line storage, and wherein the unguided section of the carrier is windable and unwindable in reverse layers about the winding center as the guided part of the section of the carrier is wound and unwound.

18. An energy supply system for a tool attachable to a hoist, comprising:

a line storage for winding and unwinding an energy line around a winding center of the line storage device;

a carrier configured to carry the energy line, the line storage having an opening for intake and removal of the carrier and the energy line; and guides configured to guide the carrier through the opening so as to guide the carrier and the energy line in sections in the line storage to the winding center of the line storage via:

a first guide section through a first guide arch, and a second guide section adjoining the first guide arch and through a second guide arch, and a third guide section adjoining the second guide arch and lying further inwards than the first guide section relative to the winding center, wherein a position of the winding center in the line storage is adjustable.

19. The energy supply system according to claim 18, wherein the winding center in the line storage is linearly movable in a direction of the first guide section, the second guide section, and the third guide section, and/or in a direct transverse to the first guide section, the second guide section, and the third guide section.

* * * * *